May 7, 1963
N. M. RIEGER
3,088,499
PACKAGING APPARATUS
Filed April 14, 1960
5 Sheets-Sheet 1
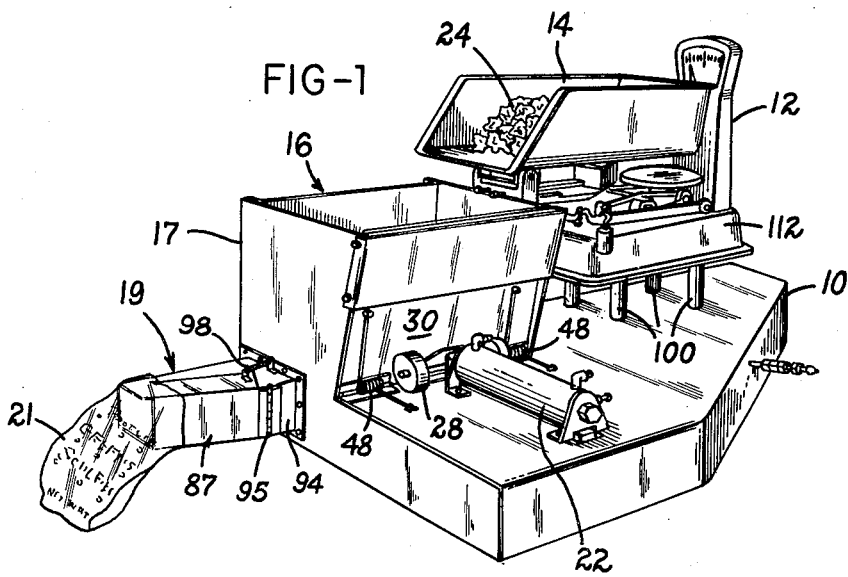
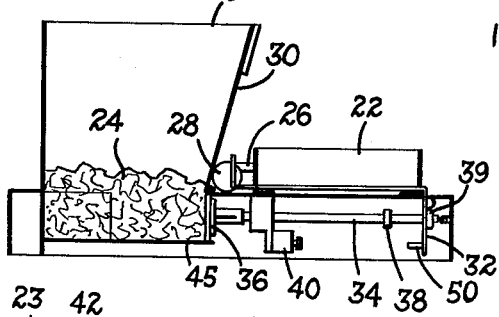
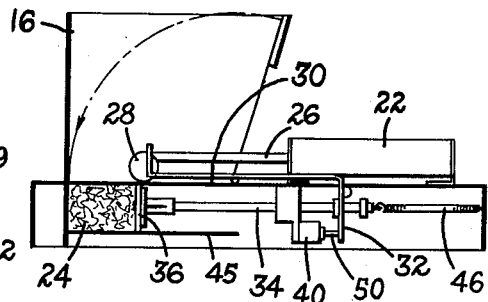
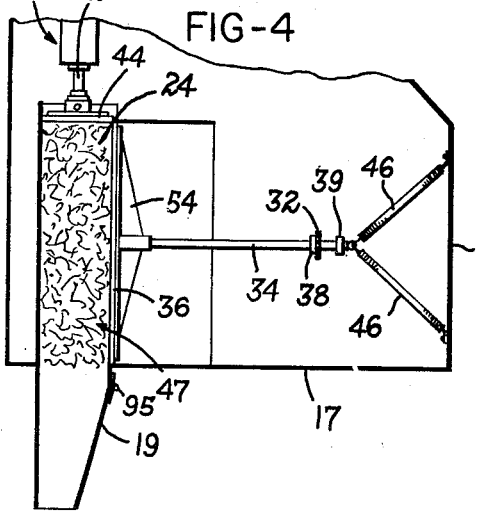
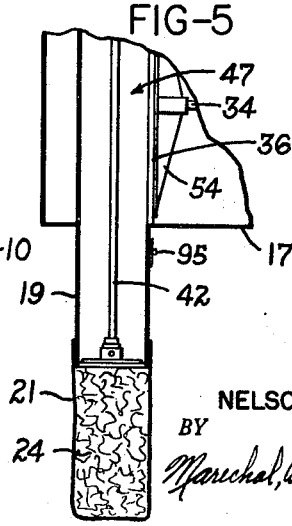
INVENTOR.
NELSON M. RIEGER
BY
Marechal, Biebel, French & Bugg
ATTORNEYS

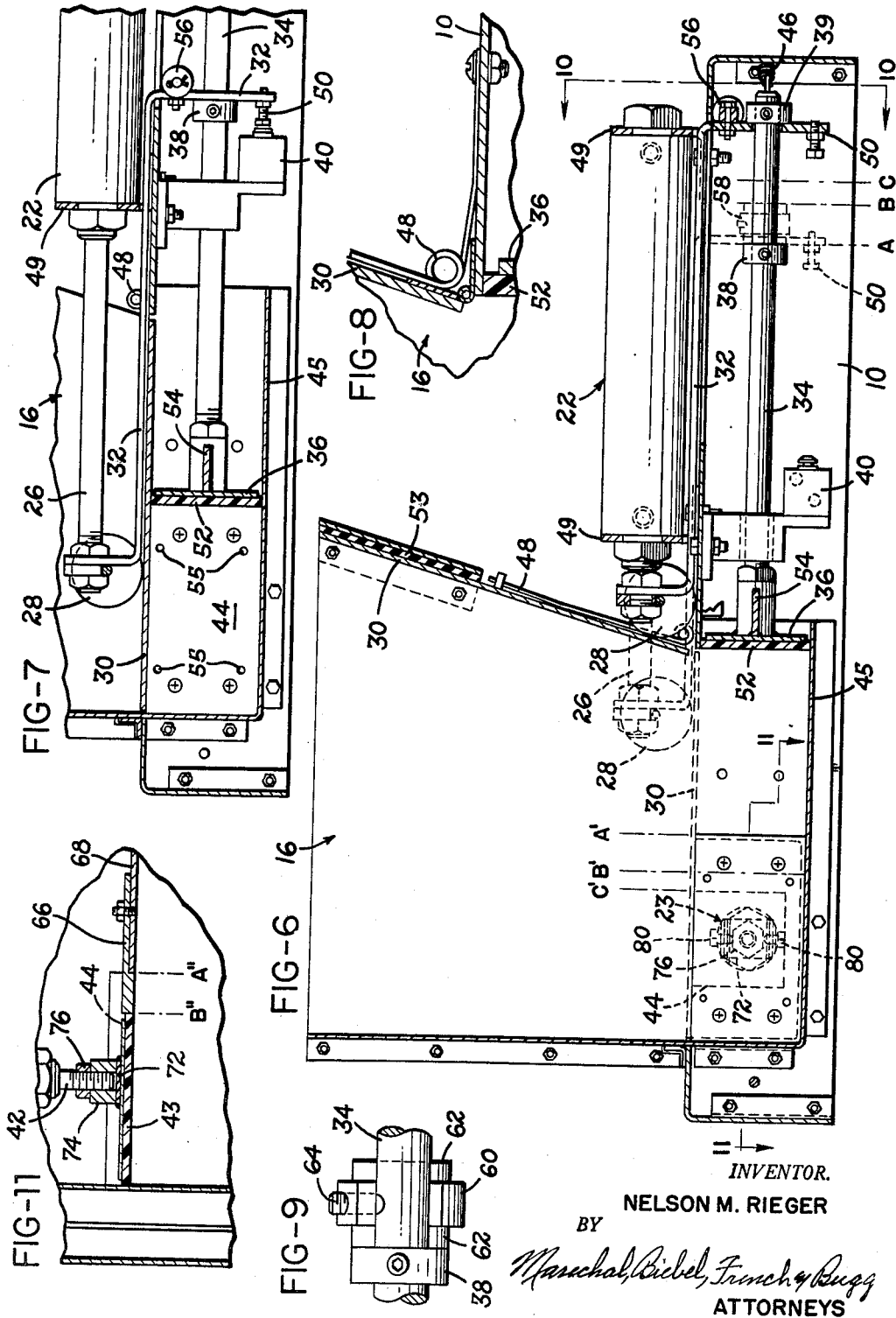

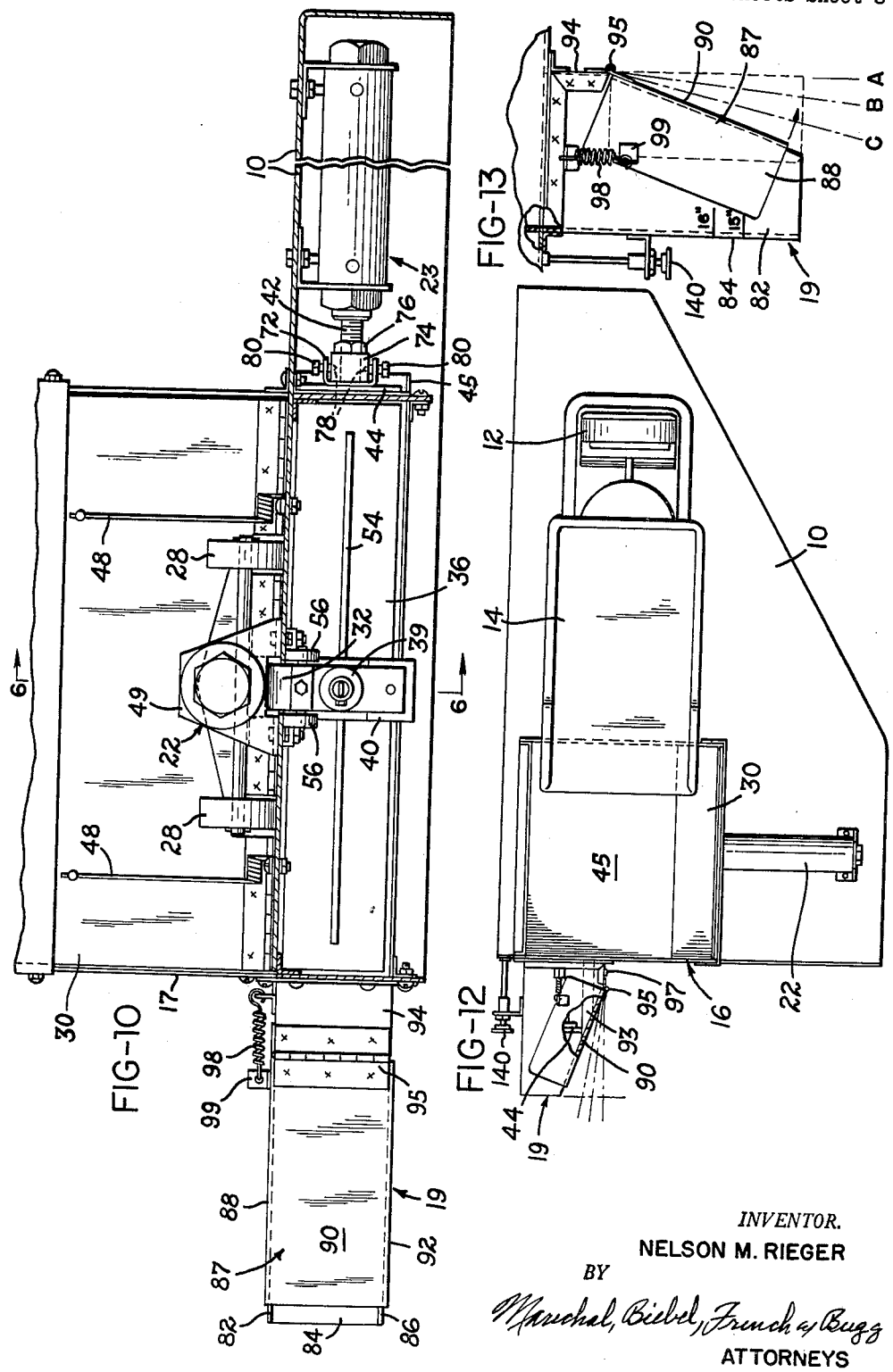

May 7, 1963  N. M. RIEGER  3,088,499
PACKAGING APPARATUS
Filed April 14, 1960  5 Sheets-Sheet 4
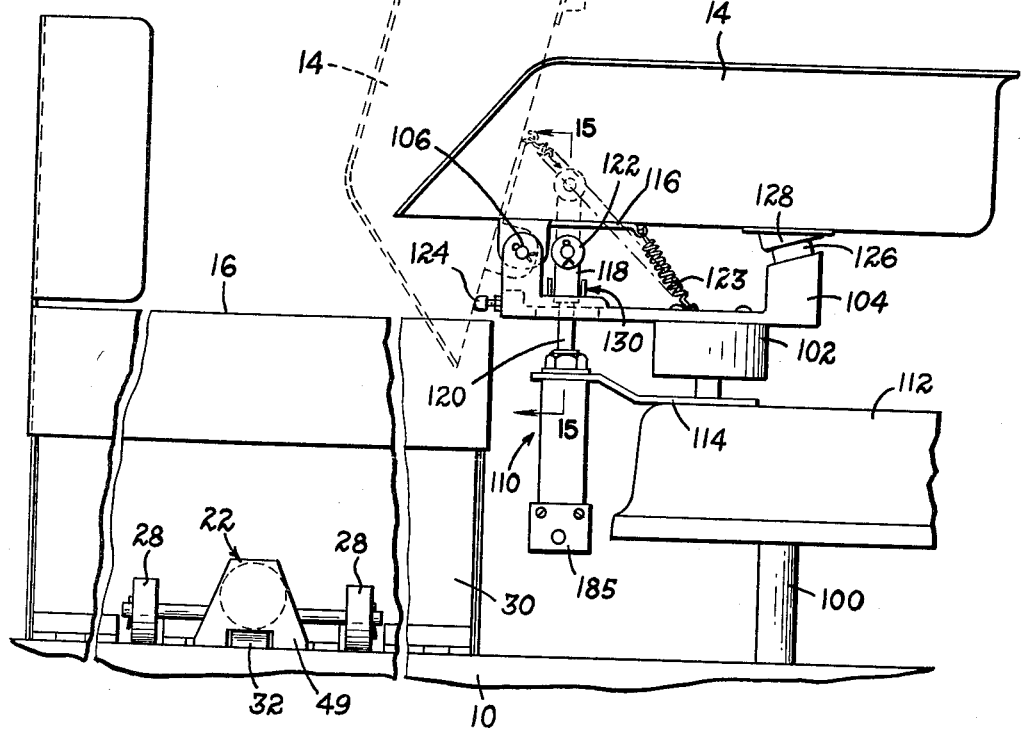
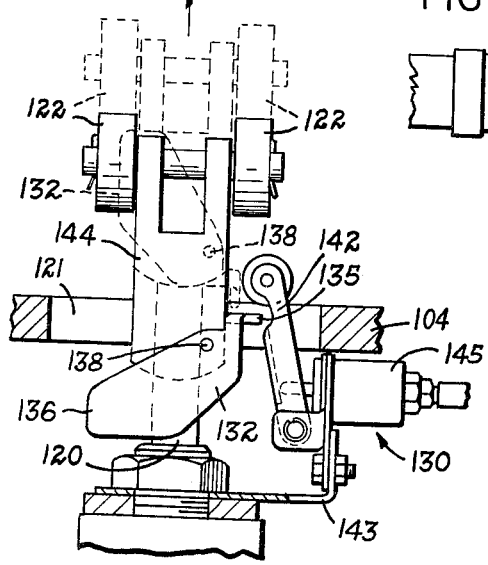
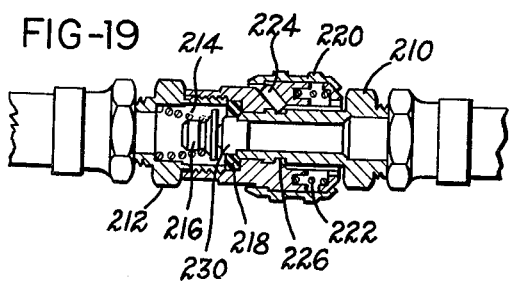
INVENTOR.
NELSON M. RIEGER
BY
Marechal, Biebel, French & Bugg
ATTORNEYS

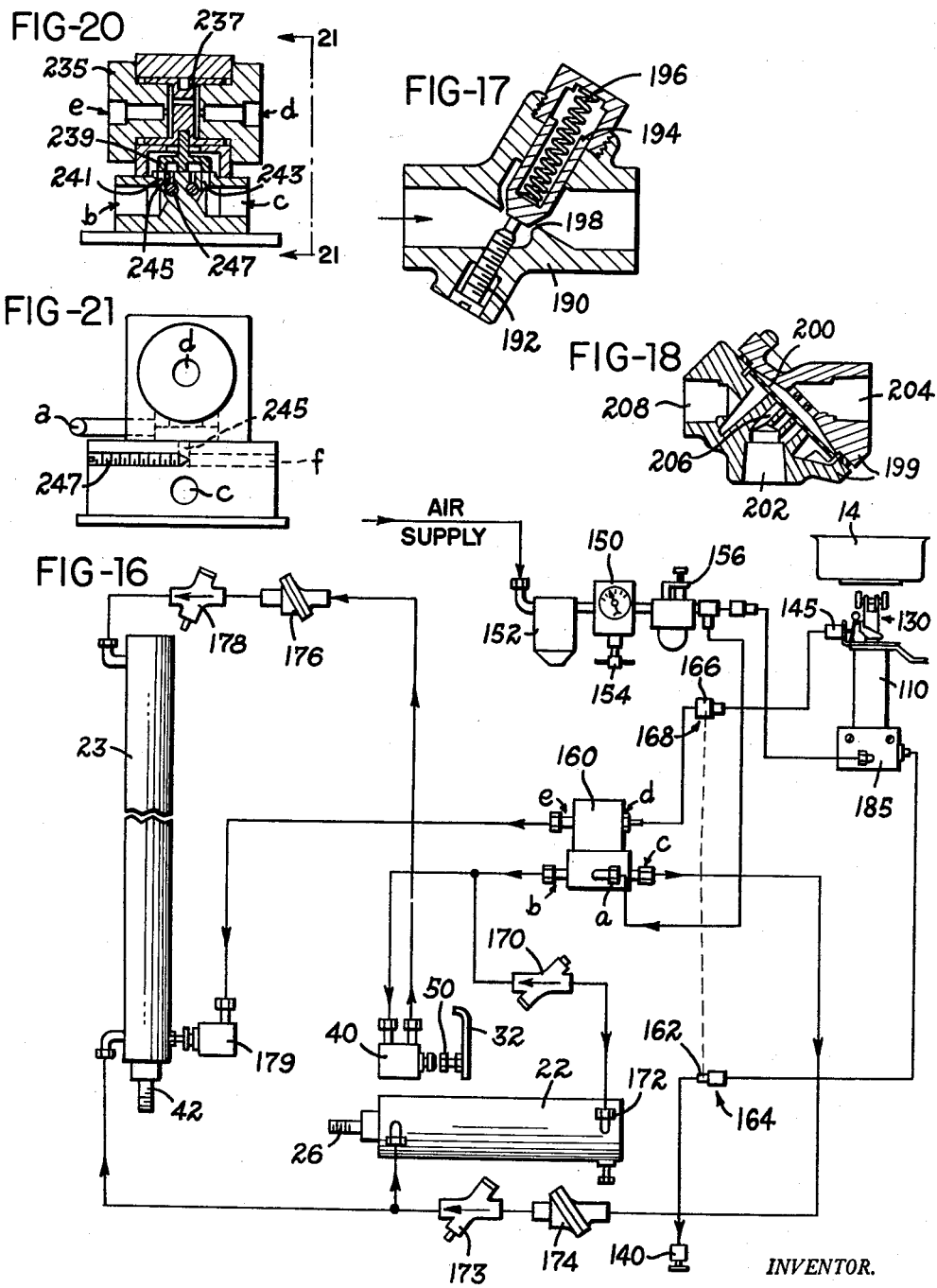

United States Patent Office 3,088,499
Patented May 7, 1963

3,088,499
PACKAGING APPARATUS
Nelson M. Rieger, Oakwood, Ohio
(Rear 202 Mound Ave., Miamisburg, Ohio)
Filed Apr. 14, 1960, Ser. No. 22,195
7 Claims. (Cl. 141—81)

The present invention deals with a novel arrangement for packaging a predetermined quantity of produce by employing a variable volume chamber for compressing or rearranging the produce to a desired volumetric dimension without crushing the produce.

Those working in the art of handling and packing fresh produce, in particular, are aware of the fact that in most instances the produce represents fairly bulky items. In addition to being bulky, very often the produce is wet, either because of recent washing or to maintain the produce in a fresh condition. Due to the fact that such produce is quite fresh when being packaged for consumer resale, it is usually springy or crispy. This springiness in the fresh produce tends to retard any attempts to confine the produce in a container during a packing operation. This is especially true in the case of leaf-like produce exemplified by such things as kale, spinach, turnip greens, etc.

It is desirable to produce a device which will suitably compress the produce to a smaller volume of predetermined dimension without crushing it, thereby enabling the produce to be efficiently placed in containers. In view of the fact that packaging of fresh produce is normally done on a fairly large scale, it is advantageous to provide a device which automatically compresses the produce to a given volume and loads it into the packaging containers.

In operations involving the packaging of various weights of different species of produce, it is also desirable to provide a versatile apparatus capable of rapidly and efficiently packing various weights of different species of vegetables or produce. This is especially true in view of the fact that many of the consumer outlets constitute relatively large self-service grocery stores wherein large amounts of prepackaged produce of various weights are sold.

Considering the fact that the produce is generally wet, as mentioned, the areas and the machinery employed in packaging the produce are subjected to dirt and water. In the case of leafy and leaf-like vegetables which are being prepackaged, it is desirable to employ a device which can be easily cleaned of the accumulated dirt and broken leafy members caught in various parts of the machine thereby considerably facilitating in maintaining the working area in a clean condition.

Also in the case of leafy produce, which constitutes a bulky, large volume variety of produce, it is desirable to provide apparatus adapted to pack various quantities of different species of different produce. Since a given weight of the produce can only be compressed to a certain extent without crushing it, it would be of considerable advantage to provide a device not only adapted to package a single weight of various type leafy produce, but to provide a device which is capable of packaging various weights of various species of leafy produce. Alternatively, it may be desirable to compress a given weight of material to different dimensions, variable with different species being packaged.

Accordingly, it is an object of this invention to provide a novel device for rapidly packaging a given quantity of loose bulk material.

It is another object of this invention to provide a device having a variable volume container and a discharge nozzle which varies in accordance with the changing final volume of the material being packaged.

Another object of this invention is to provide a packaging device which maintains the material compressed until it is placed in the container.

It is another object of this invention to provide a device having a controlled variable volume container or chamber which is adjustable in accordance with the weight or volume of material being packaged.

A still further object of this invention is the provision of a device which dumps a given quantity of material into a hopper and automatically compresses, without crushing, the material for packaging in suitable containers.

It is still a further object of this invention to provide for adjustment of such a variable volume container in a simple manner.

A further object of this invention is to provide a packing device which is easily maintained in sanitary condition due to the novel construction of the variable volume chamber and pneumatic piston assemblies.

Other objects and advantages of the present invention will be apparent from the following description, the accompanying drawings and the appended claims.

In the drawings—
FIG. 1 is a view in perspective of a packaging apparatus constructed in accordance with the present invention;
FIGS. 2–5 illustrate in schematic fashion the operation of such a packaging apparatus;
FIG. 6 is a sectional view taken generally along the line 6—6 of FIG. 10 with certain parts shown in elevation;
FIG. 7 is a detailed view, partly in elevation and partly in section, showing the compressing mechanism with the compressing piston in the extended position;
FIG. 8 is a fragmentary enlarged detailed view of a portion of FIG. 6 showing the spring and hinge arrangement;
FIG. 9 is a view on an enlarged scale of the adjustable stop for the compression mechanism;
FIG. 10 is a view partly in section and partly in elevation taken generally along the line 10—10 of FIG. 6;
FIG. 11 is a fragmentary sectional view along the line 11—11 of FIG. 6;
FIG. 12 is a plan view of the packaging apparatus constructed in accordance with this invention and as shown in FIG. 1;
FIG. 13 is an enlarged detailed view of the adjustable discharge nozzle as shown in FIG. 12;
FIG. 14 is a side view of the dump scoop and dump scoop power assembly as shown in FIGS. 1 and 12;
FIG. 15 is a view on an enlarged scale taken generally along the line 15—15 of FIG. 14;
FIG. 16 is a schematic diagram of the pneumatic system for operating the various components of the present invention;
FIG. 17 is a sectional view of the flow regulator valve of FIG. 16;
FIG. 18 is a sectional view of the quick exhaust valve of FIG. 16;
FIG. 19 is a sectional view of the quick disconnect coupling as shown in FIG. 16;
FIG. 20 is a sectional view of the four-way control valve as shown in FIG. 16; and
FIG. 21 is a view of the four-way control valve taken along the line 21—21 of FIG. 20.

Referring to the drawings, which illustrate a preferred arrangement of the packaging apparatus, FIGS. 1 and 12 show views of the location of the various elements constructed in accordance with the present invention with the pneumatic connections removed so that the arrangement of the elements can be more easily seen. Located and housed on the stainless steel base member 10 is a platform scale 12 and a plastic dump scoop 14 for weighing out the desired amount of produce. The dump scoop is arranged with respect to the stainless steel hopper 16 such that when the rear end thereof is raised to the upper position, the dump scoop will empty its contents into the hopper. On the side 17 of the hopper opposite the dump scoop is a discharge nozzle 19 which provides for egress of the weighed-out produce. A container 21 of any suitable type, such as a flexible plastic bag, may be arranged on the discharge end of the discharge nozzle for receiving the compressed material. Located and supported by the base 10 is the compressing assembly 22, while a discharge or ram assembly 23 is supported on the underside of base member 10 as best seen in FIG. 10.

The overall operation of the device can be seen with reference to FIGS. 2 through 5 which illustrate the manner in which the produce is compressed to the desired volume. After the produce 24 has been placed in the hopper 16 by the dump scoop, the compressing assembly 22 is activated and as the driving piston 26 moves forward, the front rollers 28 (of nylon or suitable plastic) contact a hinged cover plate or extending portion 30 of the side wall to force the same across the chamber as is shown in FIG. 3. The function of this cover is to compress the produce initially into a closed volume in the base section of the hopper after the cover has been closed.

As the driving piston 26 moves to close the hinged cover plate 30, the lost motion linkage 32 being fixed to the forward end of the piston 26 is carried forward and engages an adjustable stop 38 located on the compressing piston 34. Once contact has been made between the linkage connection 32 and the stop 38, the compressing piston 34 attached to the one movable chamber wall 36 is forced into the bottom portion of the hopper 16 compressing the produce 24 to the final volume.

As is noted in FIG. 3, the pneumatic sequence valve 40 located on the underside of the compressing assembly 22 is actuated by the linkage 32 to cause the discharge piston 42 to move the compressed produce through the discharge nozzle 19.

FIG. 4 shows the driving piston 26 in the fully extended position compressing produce 24. As the sequence valve 40 is activated, discharge piston 42 which is attached to a second movable wall 44 having a nylon or suitable plastic face 43, is activated to force the compressed produce 24 through the variable volume chamber into the container 21. This is best seen in FIG. 5 which shows the discharge piston in its fully extended position through the discharge nozzle 19 with the produce 24 forced into the container 21.

Thus it can be seen that the hinged cover plate 30, the first movable wall 36, the second movable wall 44 and base plate 45 form a variable volume chamber 47 in the base of hopper 16.

After discharge piston 42 has moved the full length of the variable volume chamber 47 and through the discharge nozzle 19, the discharge piston 42, the driving piston 26 and the compressing piston 34 are returned to their normal positions bringing walls 36 and 44 to rest just short of the edge of base plate 45. The compressing piston 34 and the driving piston are returned to the rest position with the assistance of a pair of spring members 46 which are attached at one end to the base member 10 and at their other end to the rear of the compressing piston 34. These springs also serve to offer some resistance during the forward movement of the compressing piston 34 thereby preventing overrunning of the piston 34 and providing for a smooth compressing stroke. The hinged cover plate is returned to the normally open position by means of springs 48 attached to the base 10 and the cover plate 30. FIG. 8 shows the details of the hinge and spring arrangement.

As will be noted from examination of FIGS. 4 and 5 and 12, the discharge nozzle is spring biased to open in accordance with the final volume of the compressed produce 24.

The details of the compressing assembly and hopper are shown in FIG. 6 wherein the same reference numerals employed in FIGS. 1–5 are employed to identify the same elements.

The compressing assembly 22 is secured to the base member 10 by means of support brackets 49, located on each end of the piston assembly and attached securely to the base by means such as bolts. On the forward end of the driving piston 26 is a Z-shaped lost motion linkage 32, which travels in a slot provided in the base member 10. Attached to one end of the linkage 32 is a sequence valve contact arm 50, which strikes the sequence valve 40 to program the movement of the ram piston 42. As can be seen from the drawing, the compressing piston 34 is attached to one movable wall 36, while on the front of this movable wall is a nylon or other suitable plastic face 52 which resists corrosion. Also attached to the forward end of the driving piston 26 are a pair of rollers 28 which bear against the movable cover plate 30, and urge the cover plate across the variable volume chamber 47 located in the base of the hopper 16. The one wall of the hopper immediately above the hinged cover plate 30 has a bumper 53 of sponge rubber or some other suitable material, which takes up the shock of the cover plate 30 as it is returned to the normally open position by means of cover plate springs 48. A stiffening strut 54 is secured to the forward end of the compressing piston 34 to prevent lateral movement of the movable wall assembly 36, as the assembly is urged into the variable volume chamber 47 during the compression stroke.

As was stated above, the initial movement of the driving piston urges the rollers 28 against the hinged cover plate 30 and forces the cover plate across the variable volume chamber. Before the compressing piston is activated, this cover plate must be closed to initially compress the produce. Subsequent to this initial movement of the driving piston 26, the compressing piston 34 is actuated due to contact between one end of the lost motion linkage 32 and the adjustable stop 38 located on the compressing piston 34. Since the driving piston 26 tends to pull the forward end of the lost motion linkage in an upward direction as the material is compressed, a pair of rollers 56 are provided, one on each side of the linkage, to retard the upward movement of the piston and lost motion linkage. The initial stroke of the driving piston before activation of the compressing piston is shown in the dotted portion of FIG. 6.

FIG. 7 is a view similar to FIG. 6, however, it shows both the driving piston 26 and the compressing piston 34 in the fully extended position. As both pistons move their full stroke according to the predetermined adjustment of the stop 38, contact is made between the sequence valve contact arm 50 and the sequence valve 40 which activates the ram or discharge piston.

Once the material has been compressed by closing the hinged cover 30 and the compressing piston has moved the one movable wall 36 of the variable volume chamber 47, the ram piston or discharge piston 42 is activated to force the produce through the discharge nozzle into a suitable container. The ram piston 42, the driving piston 26 and the compressing piston are then returned to the start position. When the rollers 28 are pulled away from the hinged cover plate, the springs 48 urge the hinged cover plate to the normally open position and the lost motion linkage 32 contacts the fixed stop 39 on the terminal end of the compressing piston and the entire device is prepared for the next compressing cycle.

Adjustment of the final volume of the variable volume container 47 in accordance with variations in the weight or volume of produce being packaged is accomplished, in the instant device, by providing adjustable stops for the compressing piston and variable surface area walls 44 attached to the front of the discharge or ram piston 42.

FIG. 6 illustrates the scheme employed in providing the adjustment of the variable volume chamber. With the adjustable stop secured in position A, the movable wall 36 is moved to position A' in the variable volume chamber. Accordingly, with stop 38 in position A, the size of movable wall 44 is adjusted, by securing to the front face of piston 42, a relatively large wall insert. Thus, with the compressing piston extended to its full stroke, as determined by the position of stop 38, the edge of the adjustable surface area wall 44 will abut the nylon or plastic member 52 of movable wall 36. Hence, when the ram piston 42 moves through the variable volume chamber, all the produce compressed within that chamber will be forced through the discharge nozzle.

If one desires to compress the produce to a smaller final volume, inserts 58 are secured to the compressing piston 34 between the adjustable stop 38 and the rear end of the piston. Assuming that the largest insert is secured to the compressing piston 34 and terminates in a plane illustrated by the line C in FIG. 6, the size of the variable surface area wall 44 will be decreased a corresponding amount so that as the piston 34 is extended to its full stroke, one edge of the wall 44 will contact the plastic member 52 of movable wall 36. Similar procedure is employed in selecting a final volume somewhere between A and C, and if an insert of the B size is employed, a wall insert B' is employed on the face of ram piston 42.

The details of the stop are shown in FIG. 9, wherein the adjustable stop 38 is shown mounted on the compressing piston 34. With only stop 38 on the shaft, the compressing piston moves to position A' as illustrated in FIG. 6. As inserts or spacing collars are placed on the compressing piston shaft, the piston is moved a further distance into the chamber depending on the size of the insert or collar. While two sized collars have been discussed, one corresponding to size B and one of size C, it is understood that any number of inserts or collars of various sizes could be employed, provided corresponding wall inserts are employed.

The insert or collar shown in FIG. 9 consists of a C-shaped member 60 and raised portions 62, and is secured to the compressing piston by a set screw 64. This set screw 64 is set off center of the vertical axis of the compressing piston so that as the screw is tightened, the collar is drawn tightly to the piston shaft. A similar arrangement is employed with the various size collars except that the sizes of the raised portions 62 are varied according to the desired size.

FIG. 11 illustrates the manner in which the surface area of the variable surface area movable wall is adjusted in accordance with the stroke of compressing piston 34. If a relatively large final volume is desired, the compensating plate 66 is removed from side wall extension 68 and the large variable surface area wall 44 is affixed to the front end of ram piston 42. Thus it can be seen that the edge of the A' size wall insert would extend to the position A" as shown in FIG. 11. Accordingly when the compressing piston, adjusted for stroke movement A, enters the variable volume chamber, the piston stroke will end in the plane A".

When the B size collar is employed on the compressing piston 34, it is necessary to employ the B' size wall insert and the B" size compensating plate. Again with the proper selection of the inserts, the final volume of the variable volume chamber is decreased from that of the series of the A inserts, since the compressing piston now moves to position B". Due to the fact that wall insert B' and compensating plate B" have been inserted, and since compressing piston 34 moves into the chamber a distance corresponding to the adjustment of collar B, the edge of the plastic portion 43 of the wall 44 contacts the plastic portion 52 of wall 36 when the compressing piston has moved the full limit of the stroke. The produce having been compressed, the ram or discharge piston 42 is activated to force the movable wall 44 through the chamber and through the discharge nozzle.

In similar fashion, the adjustable collar C can be placed on compressing piston 34, using corresponding wall insert C' and compensating plate C" to provide for a smaller volume than provided by the B series of inserts. The operation of the assembly is exactly the same with each set of inserts.

It is not necessary with each change of inserts to adjust the length of adjustable sequence valve contact arm 50 since it will contact the sequence valve 40 as it is moved forward thereby energizing the ram or discharge piston 42 in the proper sequence.

While the explanation above has employed the terms A, B and C and shown relative dimensions in the drawings, it is understood that the choice of dimensions is in no way limited by the above illustration. Virtually any size collar inserts and compensating plates can be employed provided the values are chosen so that as the compressing piston finishes its stroke, the edge of the plastic portion of the variable surface area wall will contact the forward face 52 of movable wall 36 and provided the size of the discharge nozzle is adjusted to allow movement of wall 44 therethrough.

FIG. 10 is a view of the assembly from the rear of the compressing assembly and showing the details of the ram piston and the mounting assembly of the variable surface area wall 44. Similar reference numerals are employed to identify similar parts as illustrated in FIGS. 6, 7 and 11.

Located and affixed by support brackets beneath the base 10 is the ram piston assembly 23. The forward end of the ram or discharge piston 42 carries the mounting assembly for the variable surface area wall 44 consisting of a C-shaped clamp 72 permanently fixed to the metal plate 44 of the movable wall. A clamp collar 74 is screwed to the forward portion of ram piston 42 and locked in place by nut 76 which is tightened against the collar 74.

Since the size of the surface area of wall 44 is varied while the ram piston assembly remains fixed, there is a tendency for the movable wall to wobble due to the fact that the piston is not centered in the wall as various wall sizes are employed. This tendency is eliminated in the present invention by arranging the holes 78 in the collar 74 in an axis offset with respect to the movement of locking bolts 80. Thus, as the locking bolts 80 are threaded through the holes in the C-clamp 72, the clamp is drawn tightly to the collar 74 due to the offset position of the holes 80. Each of the wall portions corresponding to sizes A', B' and C' is affixed to the collar 74 in similar fashion.

The discharge nozzle constructed in accordance with the instant invention is arranged so that it maintains the produce in compressed condition as the produce is forced into the container. As can be seen from FIGS. 10, 12 and 13, the discharge nozzle 19 is formed in a wall of the variable volume chamber 47 opposite the discharge or ram piston 42. Three of the walls 82, 84 and 86 are fixed to the side wall 17 of the hopper while three other walls 88, 90 and 92 are attached to the fixed extending portion 94 of the discharge nozzle by a hinge 95.

Thus the discharge nozzle consists of a six sided member forming a four sided variable volume discharge exit having a fixed set of walls 82, 84 and 86 and a movable wall assembly 87 defined by the set of walls 88, 90 and 92. Since movable wall assembly is hinged at 95, the two movable walls 88 and 92 slide over a portion of the fixed walls 82 and 86. The movement of the movable side wall 90 towards fixed side wall 84 is limited by the ends of fixed walls 82 and 86.

Mounted on the extending portion 94 of the discharge nozzle is a spring member 98 having one end 99 thereof fixed to the movable wall 88 of the discharge nozzle for urging the movable wall 90 into contact with the fixed walls 82 and 86. As the ram or discharge piston comes through the discharge nozzle, the movable wall assembly 87 is rotated outwardly on hinge 95 a distance corresponding to the size of movable wall 44. For example, when the series A inserts are employed, the movable wall assembly is rotated until the wall 90 lies in the plane A as shown in FIG. 13. In similar fashion as the series B and C inserts are employed, the movable wall assembly 87 is rotated about the hinge 95 until the wall 90 lies in the planes B and C respectively.

Operation of the device has indicated that as the B and C series inserts are employed, there is an occasional tendency for some of the compressed material to remain in the pocket portion between hinge 95 and the hopper wall 17. To eliminate this condition, should it arise, discharge nozzle inserts may be employed as shown in FIG. 12. Since this condition does not exist when the largest or A series wall inserts are employed, no discharge nozzle insert is needed for the A size wall.

In the case of B and C sized wall inserts, a corresponding B and C size discharge nozzle insert may be employed if needed. As shown, if the C series inserts are employed, a discharge nozzle insert 93 is secured to the inner portion of the discharge nozzle by screws 97 or other suitable means such that no head or projection lies between the one side of wall member 44 and the insert 93 to cause marring of the wall member. As the wall member 44 progresses through the discharge nozzle, contact is made with the insert, and the movable wall assembly 87 is rotated as the wall 44 comes in contact with wall 90 of the discharge nozzle. The operation of the discharge nozzle is the same when a B sized discharge nozzle insert is employed as shown in the dotted lines of FIG. 12.

Conveniently placed along one side 82 of the discharge nozzle are a series of scribed indexing marks which offer a guide as to the position of the container. Since the volume of the discharge nozzle varies in accordance with the variation of the final volume of the compressed material, it is necessary to place the proper sized container or bag at the proper point on the nozzle. For example, if the series A inserts are employed, the movable wall assembly 87 of the discharge nozzle will be opened to plane A as shown in FIG. 13. If a small container, for example a sack having a mouth of fifteen inch periphery, is placed over the discharge nozzle on the sixteen inch scribe mark, the sack will be split as the movable wall assembly is rotated to the A position. Accordingly, it can be seen that a container size is chosen in accordance with the size of the inserts employed and placed on the proper point on the discharge nozzle. In case of a large container, for example an eighteen inch sack, the container can be placed on any point of the discharge nozzle since the sack is large enough to accomodate the full movement of the movable wall assembly of the discharge nozzle.

The above examples are cited as illustrative of the principle employed in the present case and are not to be construed as limitations on the instant device. It is understood that any sized container can be employed provided the proper selection of inserts is made and provided the container is placed on the proper point of the discharge nozzle.

If desired, provision can be made for automatically dumping a pre-weighed amount of produce into the hopper. FIG. 14 shows an arrangement of a scale and a power operated dump scoop wherein a conventional scale 12 (also shown in FIG. 14) is mounted on the base 10 by means of supporting legs 100 or other suitable means.

The dump scoop 14 of resin impregnated fiberglass, plastic or other suitable material is supported on the balance pan 102 by dump scoop bracket 104 and hinged at point 106 on the forward end of the bracket and the forward end of the scoop. A dump scoop power assembly 110 is supported on the base 112 of scale by a suitable bracket 114 for rapidly raising the dump scoop to the upward position as indicated by the dotted line portion of FIG. 14. Located on the front portion of scoop 14 is a drive bumper 116 which is contacted by the forward end 118 of the power dump piston 120.

The power dump piston 120 is fitted within an aperture 121 in bracket 104, and since the movement of the piston is in a fixed upward direction, rollers 122 are provided on the front end of the power dump piston to engage the drive bumper 116 when the scoop is urged into the dump position. A spring 123 is fixed to the bracket 104 and the base of the scoop for providing smoother movement of the scoop to the dump position. To prevent the forward end of scoop 14 from hitting the hopper 16, a suitable bumper 124 is provided to retard the rotational movement of the scoop. Located on one end of the dump scoop bracket 104 is a rear bumper 126 which contacts the rear bumper pad 128 on the dump scoop as the scoop moves to the horizontal position with the assistance of spring 123.

Since it is desirable to provide for automatically compressing the produce once it has been dumped into the hopper, a compressing assembly actuating mechanism designated 130 is located on the power dump piston beneath support bracket 114 as shown in FIG. 15. A U-shaped tripping contact 132, having a contact lip 135 and counterweight portions 136, is pivotally mounted to the dump scoop 120 at point 138. After the pneumatically operated dump piston is activated by depressing the start button 140, located to the left of the discharge nozzle (see FIGS. 12 and 13), and the piston moves upward, the contact lip 135 passes the rocker arm 142, mounted by a bracket 143 or other suitable means to the forward end of the dump piston, and the counterweight portion 136 is rotated upwardly while the contact lip 135 moves downwardly against piston portion 144 as illustrated in the dotted portion of FIG. 15. As the piston 120 continues upwardly, the U-shaped tripping contact drops into the position, shown by the solid lines, but is located above the rocker arm.

At this point, the scoop has been emptied and the piston is returned to the retracted position. As the piston 120 moves back into the cylinder, contact lip 135 strikes the roller arm 142, thereby activating the pneumatic valve 145 which allows the compressing assembly 22 to operate. The initial upward movement of the power dump piston 120 does not cause sufficient contact between lip 135 and roller arm 142 to operate valve 145, due to the counterweight portion 136 of tripping contact 132. This upward movement of the piston 120 in addition to rotating the dump scoop to unload the produce also serves to move the tripping contact to the cocked position. Accordingly, after the produce has been dumped and the piston 120 is moved to the retracted position, the compressing assembly 22 is activated since contact lip 135 then strikes roller arm 142 which activates valve 145.

In addition to the desirable features discussed above, care has been taken to incorporate deliberately certain features which facilitate the cleaning of the device and insure smooth operation. In addition to constructing the major assemblies of corrosion and rust resistant materials such as stainless steel, roller members have been constructed of nylon or other suitable plastics which tend to resist corrosion. Moreover, the pneumatic fittings are of corrosion resistant material such as brass or bronze.

A unique feature facilitating ease of cleaning is that incorporated in the movable wall members 36 and 44 of the variable volume chamber. As was mentioned above, both the walls 36 and 44 of the variable volume, in their normal positions, rest a short distance from the edge of base plate 45. This feature is particularly desirable since, as the pistons force the walls into the variable volume chamber, some of the produce may be caught either under the wall between the base 45 and the wall members or the produce may get behind the wall members. Accordingly, as the walls move back to their normal positions, any produce on the rear side of the walls is pushed on to the floor since the base plate 45 is open on each side having a movable wall. Should any produce become trapped under the walls, it is an easy matter to remove the same by simply reaching behind the wall and picking off the material wedged under the wall.

Washing the device is easily accomplished. The base member 10 is tipped on end and the underside of the device, especially the area around movable walls 36 and 44, is then doused with liberal amounts of water. Since the structural elements in the pneumatic fittings are of corrosion resistant material, there is little problem of rusting.

One feature which contributes to smooth operation of the unit is the provision of holes 55 in the front face of movable wall 44 as is illustrated in FIG. 7 for example. The holes serve to prevent a vacuum from being created as the discharge or ram piston 42 moves to the retracted position, and thereby prevent produce from being sucked out of the discharge nozzle into the variable volume chamber.

From the above, it can be seen that an efficient automatically operated packing device has been constructed which is readily and easily cleaned. In this connection, it is pointed out that in view of the desire to maintain efficient and relatively simple operation, and considering the fact that pressurized air is generally available, the system discussed above has been designed to operate with pneumatic drives, valves, etc., although other sources of power such as electrical or hydraulic could be employed within the scope of this invention. The choice of a pneumatic system is motivated by the fact that an electrical system does not, by its nature, readily lend itself to a simple cleaning operation employing water. Secondly, the ready source of pressurized air was a material consideration in selecting a pneumatic system over a hydraulic system. In any event, it is a rather simple operation to install a small air compressor in those installations which are not already aquipped with a ready source of pressurized air.

A suitable pneumatic drive and control system is shown in FIG. 16, wherein like reference numerals have been employed to identify the same parts heretofore mentioned. A suitable supply of pressurized air is connected to a conventional pressure regulator 150 consisting of an air filter 152, a regulator body 154 and an oiler 156. The output pressure from this regulator is usually adjusted to about 80 p.s.i. Assuming initially that the packaging device is employed without a scale and dump assembly, pressurized air comes from the regulator to port a of the four-way valve 160. Since the scale and dump assembly are not employed, the male portion 162 of quick disconnect coupler 164 is connected with the female portion 166 of quick disconnect valve 168 as indicted by the dotted line connection.

At the beginning of a compressing operation, pistons 26 and 42 are in the retracted position. Produce is placed in the hopper and the operator pushes the start button 140. An unbalance is created in four-way valve 160 which allows pressurized air to flow from port b to the sequence valve 40 which is closed. Air also flows from port b in restricted fashion through the flow regulator valve 170 to the input side 172 of the compressing assembly 22. As the drive piston 26 moves out of the cylinder, back pressure is relieved in restricted fashion through flow regulator 173 to the quick release valve 174 which acts to vent the back pressure to atmosphere.

Once the piston 26 moves the full limit of travel, sequence valve contact arm 50, which is affixed to the lost motion linkage 32, contacts the button on the sequence valve 40 to allow pressurized air to flow through the sequence valve. The air flows through a quick release valve 176 to flow regulator 178, and free flows through this regulator to the ram piston assembly 23. The ram piston 42 moves out of the cylinder and its head end is relieved of back pressure through flow regulator 173 and is vented to atmosphere by quick release valve 174. When the ram piston has moved the full length of travel, valve 179 is activated to again unbalance the four-way valve 160, allowing air to flow from port c through the quick release valve 174 and free flow through flow regulator 173 to return compressing assembly 22 and ram assembly 23.

The rate of movement of the drive piston 26 is controlled by the adjustment of flow regulator 170. The movement of the ram piston 42 is very quick in view of the fact that air flows freely through flow regulator 178, in this direction but the rate of return movement of the ram piston 42 is controlled by the adjustment of flow regulator 178 since air is flowing in the reverse direction as the ram piston is retracted into the cylinder. The rate of return of the drive piston 26 is controlled by adjusting a bleed port in the four-way valve 160.

If it is desirable to employ a power operated dump scoop, the quick disconnect fittings 164 and 168 are arranged as shown in the solid lines of FIG. 16. Pressure air from the regulator flows to the four-way valve 160 and the power dump system, activating valve 185 while the line from pneumatic switch 145 is connected to port d of valve 160. Once the operator strikes the start button 140, the piston 120 moves upward rapidly and the dump scoop is rotated to the dump position. The valve 185 then allows pressure air to force piston 120 quickly into the retracted position and as the piston rod 120 moves downward, the contact lip of tripping contact 132 strikes rocker arm 142, thereby activating pneumatic switch 145. Activation of switch 145 creates an unbalance in valve 160 and starts the compressing cycle discussed above. The operation of the pneumatic components is the same during the compressing cycle regardless of whether or not the power dump assembly is employed.

FIG. 17 shows the details of a flow regulator of the type which can be employed with the present system. Within the valve body 190 is a fixed poppet 192 and a spring biased poppet 194. When air under pressure flows in the direction of the arrow sufficient force is exerted on the exposed front face of poppet 194 to overcome the pressure of spring 196 and lift the poppet 194 off the seats 198. Pressure air is then free to flow in the direction of the arrow. When air flows in the reverse direction, there is not enough active surface area of poppet 194 exposed to allow the air to unseat the poppet. In the case of reverse flow, air seeps around the poppet face and seats 198 and flows through the restricted passage between the face and seat. It is possible to adjust the rate of restricted flow by means of the screw head on pin or poppet 192 which serves to unseat poppet 194. As indicated in the schematic view, the flow regulators are installed so that free flow is in the direction of the arrow.

FIG. 18 shows the details of the type quick release or exhaust valve such as valves 174, 176 and 182, which can be employed. Located within the two-piece housing 199 is a diaphragm 200 which alternately opens and closes the exhaust port 202. As air enters the supply port 204, the diaphragm 200 is forced against the exhaust port baffles 206 thereby sealing off the exhaust port. As the diaphragm 200 is seated on the baffles 206 the ends thereof are deflected and air flows around the edges of the diaphragm and through delivery port 208. Air entering the valve through the delivery port 208 again deforms the diaphragm member 200, and it is now seated against the supply port completely sealing off the supply port and opening up the exhaust port. As can be seen from the examination of FIG. 16, three of these valves are employed to allow pressure air to move freely in one direction and exhaust any back pressure.

FIG. 19 is a detailed view of a quick disconnect fitting which can be employed with the present system. The quick disconnect fitting is formed of a male portion 210 and a female portion 212, the latter having located therein a spring member 214 which urges a bell-shaped poppet 216 against the face of seats 218. Hence with the male portion removed, air pressure and spring pressure act on the poppet 216 to hold it on the seat 218 thereby preventing the escape of air. Surrounding the female member is a locking collar 220 which is urged towards the male portion by spring member 222. As the collar 220 is moved to the left against spring pressure as viewed in FIG. 20, locking pins 224 are moved outwardly of the center so as to ride over the notches 226 in the outer surface of the male portion. Mating of the fitting is effected by moving collar 220 to the left as viewed in the drawing thereby allowing pin 224 to ride in the notches 226. Poppet 216 is unseated by the forward end 230 of the male member and air is allowed to flow through the line. A sealing lip formed between the protrusion on the forward end of the male member and the inner edge of seats 218 prevents the escape of air around the fitting.

FIGS. 20 and 21 are detailed views of the type four-way valve employed with the present invention. Within the body 235 is a sliding poppet 237 having a three pronged port control 239 at the lower end thereof. As high pressure air comes to port a, as shown in FIG. 21, air enters the lower portion in the area of 239 and leaks into the upper portion in the area 237 by bleed holes not shown. Once the start button 140 is depressed, an unbalance is created by venting the air out of port d. This allows the poppet 237 and port control 239 to shift to the right as viewed in FIG. 20, uncovering the connecting passage 241 of the b port and air now flows to the sequence control switch 40 and the input side 172 and the compressing assembly 22. The next movement of the poppet 237 is controlled by the ram piston 42 activating pneumatic switch 178 which serves to vent the e port to atmosphere. This again creates an unbalance and sliding poppet 237 and port control 239 are shifted to the left as viewed in FIG. 20. This movement uncovers connecting passage 243 of the c port and allows air to flow to regulator 180.

The ram and drive pistons are then moved in the retracted position, and back pressure from the flow regulator valve 170 is exhausted through exhaust bleed f which is now connected to port b since sliding poppet 237 and port control 239 are to the left as viewed in FIG. 20. The next compressing cycle is initiated by venting port d and causing an unbalance to the right which causes covering of exhaust passage 245 to exhaust bleed f and opening of passage 245 to port b. Adjustment of the bleed return of vent f can be made by turning the screw 247 shown in FIGS. 20 and 21.

It is understood that in the event that the power dump assembly is employed, initial unbalance to start the compressing cycle is accomplished when pneumatic switch 145 is tripping to vent the d port and unbalance the four-way valve 160.

From the above, it can be seen that a compact, efficient, smooth operating pneumatic system has been devised which ensures the proper sequence during the operation of the packaging device. Moreover, maintenance of the system offers no major problem since the majority of the various components are standard commercially available items. Additionally, sufficient adjustable elements are employed in the system so that the rate of movement of various components can be controlled.

Accordingly, the present invention provides a durable, easily cleaned and adjusted, and readily controlled packing apparatus which is uniquely adapted for packing bulk material into bags and similar containers of somewhat varying size. There are no inaccessible areas of the machine in which dirt or the like can collect, and the entire construction is easily flushed out after its use.

While the forms of apparatus herein described constitute preferred embodiments of the invention, it is to be understood that this invention is not limited to these precise forms of apparaus, and that changes may be made therein without departing from the scope of the invention which is defined in the appended claims.

What is claimed is:

1. A device for packaging variable quantities of pre-weighed material such as produce and reducing such material to a predetermined volume for packaging in a receptacle, comprising a base and first and second fixed walls attached thereto, first and second movable walls spaced from said first and second fixed walls and co-operating therewith and with said base to form a variable volume chamber receiving said material, means forming a discharge aperture in one of said fixed walls, a pivotally mounted cover plate mounted above one of said movable walls to effect initial compression of said material in said variable volume chamber, first motor driving means including a driving piston and rod and an auxiliary compressing piston for forcing said cover plate into the closed position and subsequently advancing one movable wall for reducing the volume of said chamber, stop means carried by said auxiliary compressing piston for controlling the extent of movement thereof and the movement of said one movable wall, said driving piston rod including a lost motion linkage engaging said stop for moving said auxiliary compressing piston, said auxiliary compressing piston connected to said one movable wall for compressing said material and the variable volume chamber subsequent to the closing of said cover plate, and second motor drive means for forcing the other of said movable walls entirely through said variable volume chamber for discharging said compressed material through said discharge aperture and into a packaging receptacle.

2. A device for packaging variable quantities of pre-weighed material such as produce and reducing said material to a predetermined volume for packaging in a receptacle, comprising a base and first and second fixed walls attached thereto, a first and second movable wall spaced from said first and second fixed walls and co-operating therewith and with said base to form a variable volume chamber receiving said material, a pivotally mounted cover plate mounted above one of said movable walls to effect initial compression of said material in said variable volume chamber, first motor drive means including a driving piston and rod and an auxiliary compressing piston for forcing said cover plates into closed position and subsequently advancing one movable wall for reducing the volume of said chamber, stop means carried by said auxiliary compressing piston for controlling the extent of movement of said one movable wall, said driving piston rod including a lost motion linkage engaging said stop for moving said auxiliary compressing piston, said auxiliary compressing piston connected to said one of said movable walls for compressing said material in the variable volume chamber subsequent to the closing of said cover plate, discharge aperture means provided in one of said fixed walls, a variable volume discharge nozzle in said one of said fixed walls formed by a three-sided member and a hinged three-sided member for providing a cross-sectional area comparable to the final cross-sectional area of said variable volume chamber, and second motor drive means for forcing the other of said movable walls entirely through said variable volume chamber and said discharge aperture means and said nozzle for discharging said compressed material into a packaging receptacle.

3. A device for packaging variable quantities of pre-weighed material such as produce and reducing said material to a predetermined volume for packaging in a receptacle, comprising a base and first and second fixed walls positioned at right angles to each other and attached to said base, a first movable wall opposite said first fixed wall and a second movable wall opposite said second fixed wall, said fixed and movable walls cooperating with said base to form a variable volume chamber receiving said material, a normally opened pivotally mounted cover plate mounted above one of said movable walls to effect initial compression of said material in said variable volume chamber, first motor drive means including a driving piston and rod and an auxiliary compressing piston for forcing said cover plate into a closed position and subsequently advancing said first movable wall for reducing the volume of said chamber, stop means positioned on said auxiliary compressing piston for controlling the extent of movement thereof and the movement of said first movable wall, said driving piston rod including a lost motion linkage engaging said stop on said auxiliary compressing piston, said auxiliary compressing piston connected to said first movable wall for compressing said material in the variable volume chamber subsequent to the closing of said cover plate, discharge aperture means provided in said second fixed wall, discharge nozzle means in said second fixed wall and positioned opposite to said second movable wall for mounting a packaging receptacle, and second motor drive means for forcing said second movable wall entirely through said variable volume chamber and said discharge aperture means and nozzle means for discharging said compressed material into a packaging receptacle.

4. A device for packaging variable quantities of preweighed material such as produce and reducing such material to a predetermined volume for packaging in a receptacle, comprising a scale for weighing the material to determine the quantity by weight, a hopper adjacent said scale for receiving a weighed quantity of material therefrom, means for discharging a weighed quantity of material from said scale into said hopper following a weighing operation, said hopper including first and second fixed walls having a base attached thereto and first and second movable walls spaced from said fixed walls, a pivotally mounted cover plate cooperating with said movable and fixed walls to form a variable volume chamber at the base of said hopper to receive said material, first motor drive means including a driving piston and rod and an auxiliary compressing piston for forcing said cover plate into a closed position and subsequently advancing one movable wall for reducing the volume of said chamber, stop means positioned on said auxiliary compressing piston for controlling the movement thereof and the movement of said one movable wall, said driving piston rod including a lost motion linkage engaging said stop for moving said auxiliary compressing piston, said auxiliary compressing piston connected to said one of said movable walls for compressing said material in the variable volume chamber subsequent to the closing of said cover plate, discharge aperture means provided in one of said fixed walls, a discharge nozzle extending from said chamber and providing in said one of said fixed walls an outlet of predetermined cross-section through which the compressed material may be ejected, means on said nozzle at the outlet thereof for mounting a receptacle to receive the compressed material ejected through said nozzle, and second motor drive means for forcing the other of said movable walls entirely through said variable volume chamber and said nozzle for discharging said compressed material into a packaging receptacle.

5. A device for packaging variable quantities of preweighed material such as produce and reducing such material to a predetermined volume for packaging in a receptacle, comprising a hopper including a pair of fixed walls having a base attached thereto and a pair of movable walls spaced from said fixed walls, a pivotal cover plate mounted above one of said movable walls and cooperating with said movable and fixed walls to form a variable volume chamber receiving said material, first motor drive means including means for forcing said cover plate into a closed position and a compressing piston assembly capable of selectively having one of a plurality of predetermined different stroke lengths for subsequently advancing one of said movable walls to reduce the volume of said chamber, said compressing piston assembly including a piston rod having an adjustable stop thereon for adjusting the stroke length of said assembly, said first motor drive means including a lost motion linkage engaging said stop for moving said piston rod, said piston rod connected to said one of said movable walls for compressing the material in the variable volume chamber subsequent to the closing of said cover plate, the surface area of the other of said movable walls being coordinated and correlated with the selected stroke of said compressing piston assembly such that the compressing piston stops adjacent an edge of said other movable wall and the final cross-sectional area of said chamber, means forming a discharge aperture in one of said fixed walls, and second motor drive means for forcing said other movable wall entirely through said variable volume chamber for discharging said compressed material through said discharge aperture and into a packaging receptacle.

6. A device for packaging variable quantities of preweighed material such as produce and reducing such material to a predetermined volume for packaging in a receptacle, comprising a hopper including a pair of fixed walls and a pair of movable walls spaced from said fixed walls and a base member, a normally opened pivotal cover plate mounted above one of said movable walls and cooperating with said movable and fixed walls to form a variable volume chamber receiving said material, first motor drive means including a driving piston and rod and an auxiliary compressing piston for forcing said cover plate into a closed position and subsequently advancing one movable wall to a terminal position for reducing the volume of said chamber, stop means positioned on said auxiliary compressing piston for controlling the extent of movement of said one movable wall, said driving piston rod including a lost motion linkage assembly driven by said driving piston rod and engaging said stop to move said auxiliary compressing piston a predetermined distance as controlled by the position of said stop on said auxiliary compressing piston, said auxiliary piston connected to said one of said movable walls for compressing said material in the variable volume chamber subsequent to the closing of said cover plate, means defining a discharge opening in one of said first walls, second motor drive means for forcing the other movable wall entirely through said variable volume chamber for discharging said compressed material into a packaging receptacle, and means operative as said auxiliary compressing piston moves said predetermined distance to actuate said second motor drive means for moving said other movable wall as said one movable wall reaches the terminal position.

7. A device for packaging variable quantities of preweighed material such as produce and reducing such material to a predetermined volume for packaging in a receptacle, comprising a scale for weighing the material to determine the quantity by weight, said scale including a power dump assembly having a pivotally mounted scoop for holding said material, a hopper adjacent said power dump assembly for receiving a quantity of material therefrom, said power dump assembly including power dump means for urging said scoop to a dump position for discharging a weighed quantity of material from said scoop into said hopper following a weighing operation, said hopper including first and second fixed walls having a base attached thereto and first and second movable walls spaced from said fixed walls, a pivotally mounted cover plate cooperating with said movable and fixed walls to form a variable volume chamber to receive said material, first motor drive means including a driving piston and rod and an auxiliary compressing piston for forcing said cover plate into a closed position and subsequently advancing one movable wall a predetermined distance to a terminal position for reducing the volume of said chamber, a stop positioned on said auxiliary compressing piston for controlling the movement of said one movable wall, said driving piston rod including a lost motion linkage unit engaging said stop to move said auxiliary compressing piston a predetermined distance as controlled by the position of said stop, said auxiliary piston connected to said one of said movable walls for compressing said material into the variable volume chamber subsequent to the closing of said cover plate, discharge aperture means provided on one of said fixed walls, a discharge nozzle extending from said one fixed wall of said chamber and providing an outlet of predetermined cross-section through which the compressed material may be ejected, means on said nozzle at the outlet thereof for mounting a receptacle to receive the compressed material ejected through said nozzle, second motor drive means for forcing the other of said movable walls entirely through said variable volume chamber and said nozzle for discharging said compressed material into a packaging receptacle, means for energizing said power dump assembly, means operated by said power dump means after said scoop has been placed in said dump position for causing activation of said first motor drive means, and means operative as said auxiliary compressing piston moves said predetermined distance to actuate said second motor drive means for moving said other movable wall as said one movable wall reaches the terminal position.

References Cited in the file of this patent

UNITED STATES PATENTS

| | | |
|---|---|---|
| 376,399 | Stephenson | Jan. 10, 1888 |
| 667,693 | Fuchs | Feb. 12, 1901 |
| 2,358,001 | Cross et al. | Sept. 12, 1944 |
| 2,500,819 | Hall et al. | Mar. 14, 1950 |
| 2,869,296 | Overman | Jan. 20, 1959 |
| 2,880,763 | Warner | Apr. 7, 1959 |
| 2,907,156 | Anderson | Oct. 6, 1959 |

FOREIGN PATENTS

| | | |
|---|---|---|
| 57,316 | Netherlands | Apr. 15, 1946 |
| 670,103 | Great Britain | Apr. 16, 1952 |